(12) United States Patent
Mori

(10) Patent No.: US 6,345,894 B1
(45) Date of Patent: *Feb. 12, 2002

(54) COLOR PROJECTOR

(75) Inventor: Hiroshi Mori, Kanagawa (JP)

(73) Assignee: Sony Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,342

(22) Filed: Mar. 16, 1999

(30) Foreign Application Priority Data

Mar. 26, 1998 (JP) .......................................... 10-079405

(51) Int. Cl.[7] .............................................. G03B 21/14
(52) U.S. Cl. ......................................... 353/31; 345/60
(58) Field of Search ............................. 353/31, 33, 34, 353/37, 122; 345/60, 62, 65, 64, 67, 72, 76; 313/513, 514

(56) References Cited

U.S. PATENT DOCUMENTS

| | | | |
|---|---|---|---|
| 5,317,231 A | | 5/1994 | Lee |
| 5,654,727 A | * | 8/1997 | Lepselter ..................... 345/60 |
| 5,682,081 A | | 10/1997 | Reynolds |
| 5,696,523 A | * | 12/1997 | Yano ........................... 345/60 |
| 5,745,201 A | * | 4/1998 | Kawai et al. ................ 349/110 |
| 5,820,241 A | * | 10/1998 | Wortel ......................... 353/31 |
| 5,900,982 A | * | 5/1999 | Dolgoff et al. ............... 353/81 |
| 5,909,259 A | * | 6/1999 | Ishino .......................... 353/33 |
| 5,962,975 A | * | 10/1999 | Lepselter .................... 313/586 |

FOREIGN PATENT DOCUMENTS

| | | |
|---|---|---|
| EP | 0 504 813 | 3/1992 |
| EP | 0 568 998 | 5/1993 |
| EP | 0 690 409 | 6/1995 |
| EP | 0 802 556 | 4/1997 |
| JP | 62-59919 | * 3/1987 |

* cited by examiner

Primary Examiner—William Dowling
(74) Attorney, Agent, or Firm—Rader, Fishman & Grauer PLLC; Ronald P. Kananen

(57) ABSTRACT

A color projector is made able to produce a bright and homogeneous color projection image. To this end, the color projector comprises plasma-discharge display devices (21R), (21G) and (21B) for producing respective single color images of lights of red, green and blue, a synthesizing means (22) for synthesizing the respective single color images of lights of red, green and blue from these plasma-discharge display devices and a projection optical system (23) for projecting a synthesized image from this synthesizing means (22).

21 Claims, 13 Drawing Sheets

COLOR PROJECTOR

BACKGROUND OF THE INVENTION

1. Field of the Invention

The present invention relates to a color projector capable of producing a high-luminance projection optical image.

2. Description of the Related Art

Liquid-crystal projectors are widely used as color projectors. Color projectors of a variety of arrangements have been proposed in order to produce a bright projection image. In the invention described in Japanese laid-open patent application No. 62-59919, for example, a light from a light source is separated into lights of red, blue and green colors, and images of lights of respective colors, which are modulated by a light bulb comprised of three liquid-crystals or the like provided in response to lights of these colors, are synthesized by a cube prism or a dichroic prism. In this case, lights of red and blue colors are made incident on the reflection surface of 45° of the cube prism as an S-polarized light and the other light of green color is made incident thereon as a P-polarized light, thereby improving a utilization factor of the light from the light source.

However, according to the above-mentioned arrangement, there are problems of axis alignment and position alignment for introducing the S-polarized light and the P-polarized light. Moreover, even when the color projector is arranged as described above, since lights of respective colors from the light source should be separated and lights of respective colors should be modulated by the light bulb, thereby resulting in images of lights of respective color being produced, a loss of light is large so that there is a limit in producing a bright projection image.

Moreover, according to this arrangement, a light source of a large output power is needed in order to increase a brightness. In this case, there arises a problem of heat generated from the light source. To solve this problem, a cooling means such as a powerful fan or the like is required so that a color projector is unavoidably made large in size.

As a color projector capable of producing a bright projection image, there is a color projector using a cathode-ray tube. In this case, the whole of the color projector becomes large in size. Also, since a high voltage is treated, there arise accompanying problems of considering safety or the like.

SUMMARY OF THE INVENTION

An object of the present invention is to provide a color projector in which the above-mentioned problems can be solved and a sufficiently bright color projection image can be produced, whereby the a color projector is miniaturized, avoids the handling of a high voltage and produces a homogeneous and excellent color projection image.

A color projector according to the present invention comprises plasma-discharge display devices for producing respective single color images of lights of red, green and blue, a synthesizing means for synthesizing respective single color images of lights of red, green and blue colors from these plasma-discharge display devices and a projection optical system for projecting a synthesized image from this synthesizing means.

That is, according to the present invention, images of light of red, green and blue colors of three primary colors for producing a color projection image are each directly obtained by a plasma-discharge display device whose luminance of light is high and which does not require the application of high voltage unlike a cathode-ray tube.

DESCRIPTION OF THE PREFERRED EMBODIMENTS

A color projector according to the present invention comprises a plurality of plasma-discharge display devices for producing respective single color images of lights of red, green and blue, a synthesizing means for synthesizing respective single color images of lights of red, green and blue from these plasma-discharge display devices and a projection optical system for projecting a synthesized image from the synthesizing means.

The synthesizing means for synthesizing respective single color images of lights of red, green and blue may be comprised of a dichroic prism or a dichroic mirror.

As one mode for the plasma-discharge display devices, each of the plasma-discharge display devices may be comprised of a planar-type plasma-discharge display device. These planar-type plasma-discharge display devices are arranged in such a manner that first and second electrode groups, each formed by an array of a plurality of electrode elements, are arranged on a common substrate in a so-called two-dimensional fashion and that optical images of respective colors may be produced by plasma-discharges between predetermined electrode elements of the first and second electrode groups.

As the other mode for plasma-discharge display devices, a discharge-maintenance electrode group comprised of a plurality of discharge-maintenance electrodes and an address electrode group comprised of a plurality of address electrodes are formed on a common substrate, discharge is started between the predetermined address electrode and the discharge-maintenance electrode to thereby maintain the discharge between predetermined discharge-maintenance electrodes, thereby resulting in optical images of respective colors being produced.

Examples of the color projector according to the present invention will be described with reference to the drawings. The present invention, however, is not limited to these illustrated examples.

Figure 1:
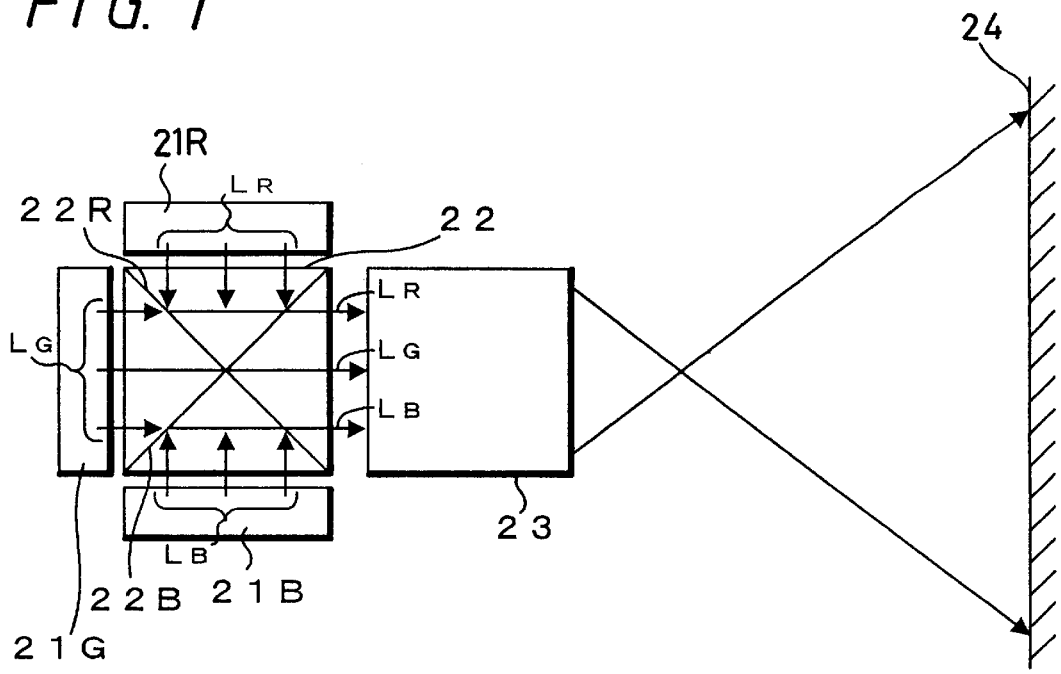
FIG. 1 is schematic diagram of a color projector according to an embodiment of the present invention.
Figure 2:
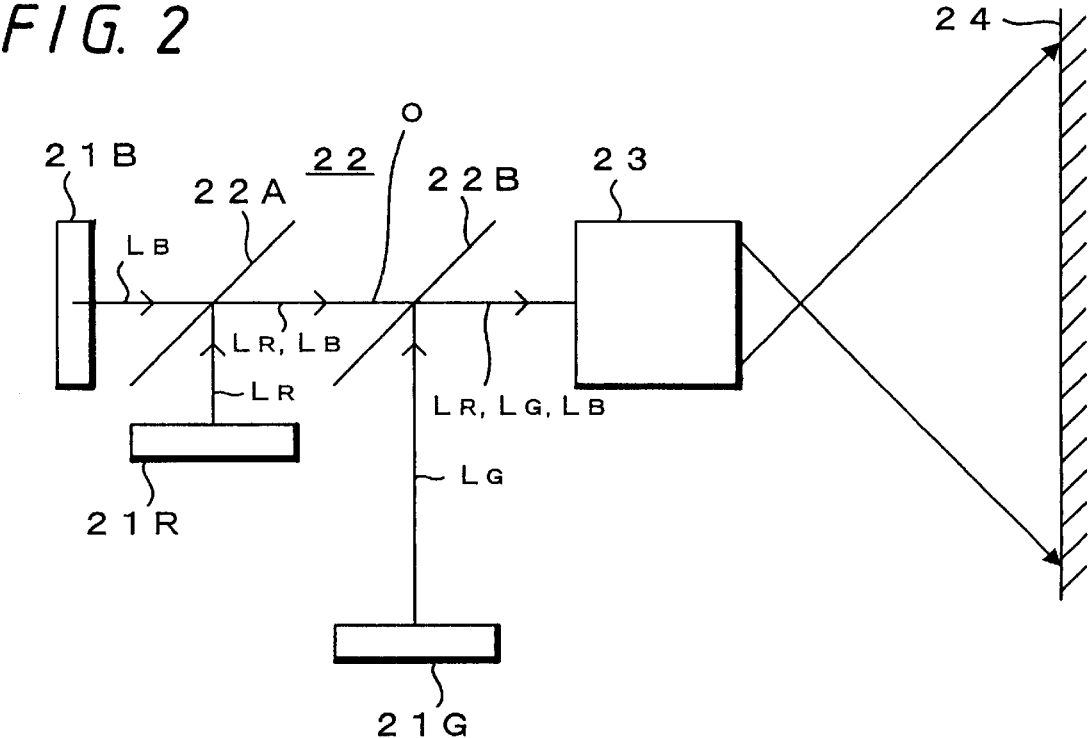
FIG. 2 is a schematic diagram of a color projector according to another embodiment of the present invention.

FIGS. 1 and 2 are respectively schematic diagrams showing respective examples of the devices according to the present invention. In the examples, the color projector comprises planar-type plasma-discharge display devices 21R, 21G and 21B for producing respective single color images of lights of red, green and blue, a synthesizing means 22 for synthesizing respective single color images LR, LG and LB of lights of red, green and blue, and a projection optical system, i.e. so-called projection lens 23 for projecting a synthesized image from this synthesizing means, i.e. color image, whereby the color image is projected onto a screen 24.

In the example of FIG. 1, the synthesizing means 22 for synthesizing the respective single color images LR, LB and LG of lights of respective red, green and blue is comprised of a dichroic prism in which reflection faces 22R and 22B having wavelength selection properties for efficiently passing a light of green wavelength and which efficiently reflect lights of red and blue wavelengths are formed in the directions perpendicular to each other. Single-color images LR, LB and LG from the plasma-discharge display devices 21R, 21B and 21G are made incident onto these reflection faces 22R and 22B with an incident angle of 45°. These reflection faces 22R and 22B synthesize the single-color light images LR, LB and LG such that they become coincident on the same axis and that they become incident on the optical axis of the projection optical system 23 as a color image.

In the example of FIG. 2, the synthesizing means 22 for the single-color light images LR, LG and LB of red, green and blue colors is comprised of a plurality of, in the illustrated example, two dichroic mirrors 22A and 22B that are disposed in parallel to each other with an angle of 45° relative to the same axis O. The dichroic mirror 22A has a wavelength selection property capable of efficiently passing the light of blue wavelength, for example, and which can efficiently reflect the light of red wavelength. The dichroic mirror 22B has a wavelength selection property capable of efficiently passing the lights of red and blue wavelengths, for example, and which can efficiently reflect the light of green wavelength.

Then, in this case, the blue light image is made incident under the condition that the optical axis of the blue light image LB from the planar-type plasma-discharge display device 21B is made coincident with the axis O of the dichroic mirror 22A. The red light image LR from the planar-type plasma-discharge display device 21R is made incident on the dichroic mirror 22A with an incidence angle of 45° from the direction perpendicular to the axis O. The two light images LB and LR are synthesized on the axis Q and these synthesized images LR, LB are made incident on the dichroic mirror 22B with an incidence angle of 45°.

On the other hand, the green light image LG from the planar-type plasma-discharge display device 21G is made incident on the dichroic mirror 22B with an incidence angle of 45°, accordingly, from the direction perpendicular to the axis O. All light images LR, LG, LB are synthesized on the axis O and then incident onto the projection optical system 23.

The plasma-discharge display devices 21R, 21G and 21B in the device according to the present invention will be described next.

These plasma-discharge display devices may be respectively comprised of planar-type plasma-discharge display devices. These planar-type plasma-discharge display devices are arranged in such a manner that first and second electrode groups, each formed by an array of a plurality of electrode elements, are formed on a common substrate in a two-dimensional fashion and that optical images of respective colors are produced by plasma-discharge generated between predetermined electrode elements of the first and second electrode groups.

This discharge may be executed with application of AC or DC voltage.

The first and second electrode groups are comprised of electrode elements (referred to as row-electrode elements and column-electrode elements) formed of a plurality of parallel electrodes extended along a first direction (referred to as a row-direction) and a second direction (referred to as a column-direction), which are crossing to each other, e.g. which are perpendicular to each other and which are arranged with a predetermined interval.

An insulating layer is interposed at the portion in which the electrode elements of the first and second electrode groups cross to each other to thereby electrically insulate the portion between the electrode elements of the first and second electrode groups.

In response to the crossing portion of the electrode elements of the first and second electrode groups, a discharge-electrode portion is formed with respect to at least one electrode element of the first or second electrode groups, and a plasma-discharge portion is formed between this discharge electrode portion and the discharge-electrode portion or electrode element of the other electrode group. The discharge-electrode portions forming these plasma-discharge portion or the discharge-electrode portion and the electrode element are spaced apart by a narrow interval d in which a plasma discharge can be generated with application of a predetermined discharge-start voltage. An interval D between the electrode elements of the adjacent first and second electrode groups in which the plasma discharge should be avoided from being generated even though a similar voltage is applied thereto is selected to be larger than the above-mentioned interval d.

The electrode elements of the first electrode group and the discharge-electrode portions of the electrode elements of the second electrode group can be formed of the same conductive layer. Specifically, the electrode elements of the first electrode group and the discharge-electrode portions of the second electrode elements can be formed of the same conductive layer by the same process. In this case, the above-described interval d can be set accurately. However, these portions can be formed of conductive layers by different processes.

Also, the planar-type plasma-discharge display device according to the present invention includes a planar-type display container in which first and second substrates are opposed with a predetermined interval and peripheral portions of the first and second substrates are sealed hermetically by glass frit, for example, to form a flat gas space therein.

At least one of the first and second substrates is made of a transparent substrate having a transmittance relative to a displayed light. Each of the first and second substrates can be formed of glass substrates, for example.

Then, the first substrate is used as a common substrate on which the first and second electrode groups are formed.

However, the present invention is not limited to the case in which the first substrate itself is used as the common substrate on which the first and second electrode groups are formed, and another substrate on which the first and second electrode groups are both formed can be disposed on the first substrate in an abutting relation.

Then, on the second substrate, there is formed a phosphor layer on which a phosphor of any single color of phosphors R, G and B which are excited to produce light of red, green and blue colors is formed.

On the second substrate on which this phosphor layer is formed, a band-like partition is protruded in an opposing relation to the electrode portion extended in the above-mentioned, second direction along the electrode element of the second electrode group, i.e. along the column direction. This partition is adapted to block a cross-talk with respect to the first direction of each unit discharge region.

When the plasma-discharge display device is arranged so as to be operated by an AC voltage, a dielectric layer is formed so as to cover at least the portions in which the first and second electrode portions are formed.

On the dielectric layer, there can be formed a surface layer having a small work function as compared with that of this dielectric layer and which has a surface protection effect capable of protecting the surface of the dielectric layer from being damaged by the discharge-plasma, if necessary.

Figure 3:
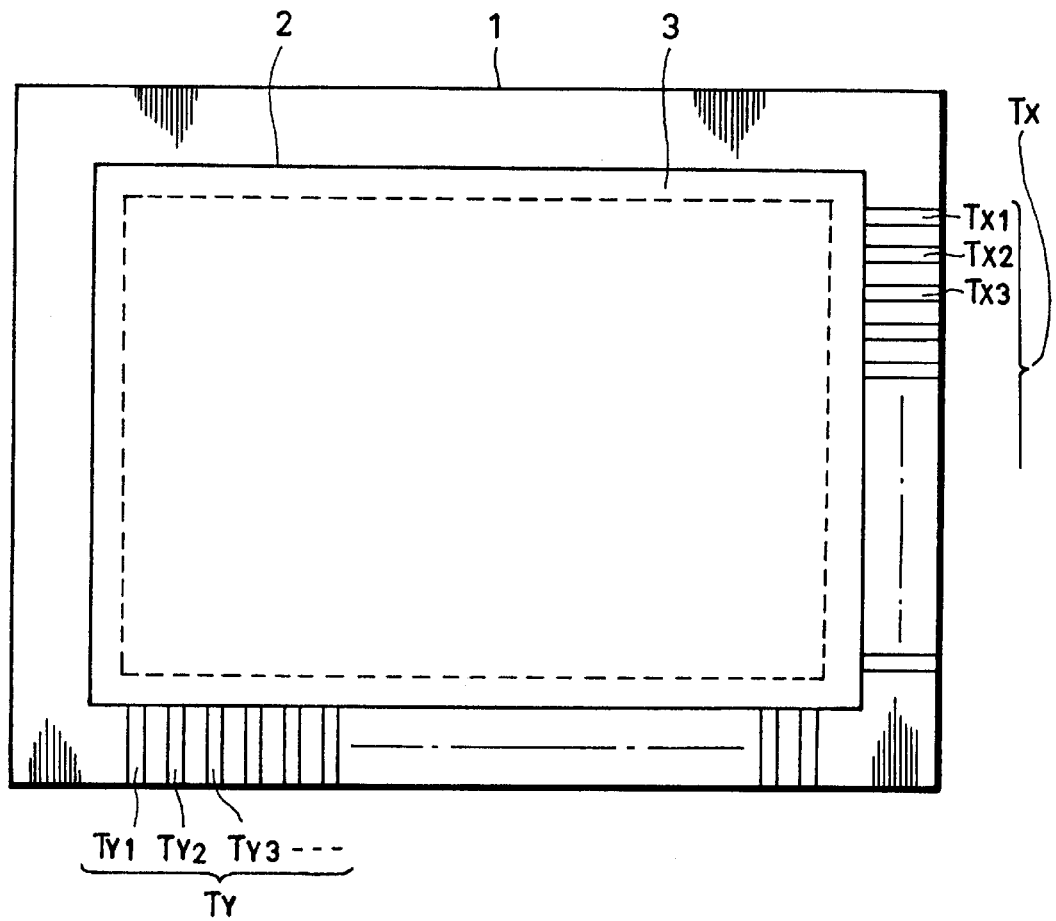
FIG. 3 is a plan view of an example of a planar-type plasma-discharge display device used in the present invention.
Figure 4:
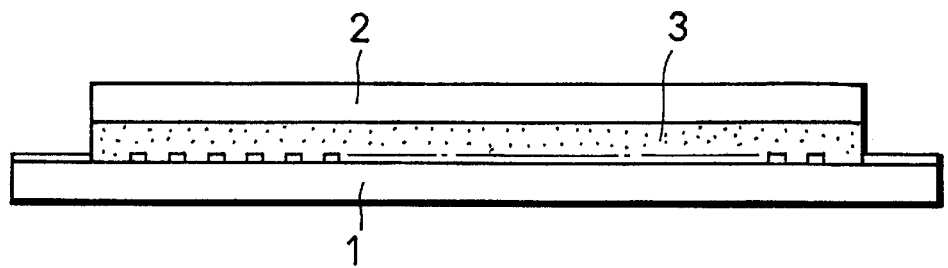
FIG. 4 is a side view of an example of the planar-type plasma-discharge display device used in the present invention.

Examples of the plasma-discharge display device will hereinafter be described with reference to FIG. 3 and the following drawings. In each example, the plasma-discharge display device is arranged so as to be driven by an AC voltage. FIG. 3 shows its plan view, and FIG. 4 shows a side view of FIG. 3. As illustrated, each plasma-discharge display device includes a planar-type display container in which a first substrate 1 and a second substrate 2, each formed of, for example, a transparent glass substrate, at least one of which has a transmittance relative to an image of light of red or green or blue color, are opposed to each other with a predetermined interval. The peripheral portions thereof are sealed airtight by a seal material 3 such as a glass frit or the like to thereby form a flat gas space between the two substrates 1 and 2.

The area of the first substrate 1 is made larger than that of the second substrate 2, and its side edge portions, i.e. four side edge portions in the illustrated example, are exposed from the respective side edge portions of the second substrate 2 to the outside.

Figure 5:
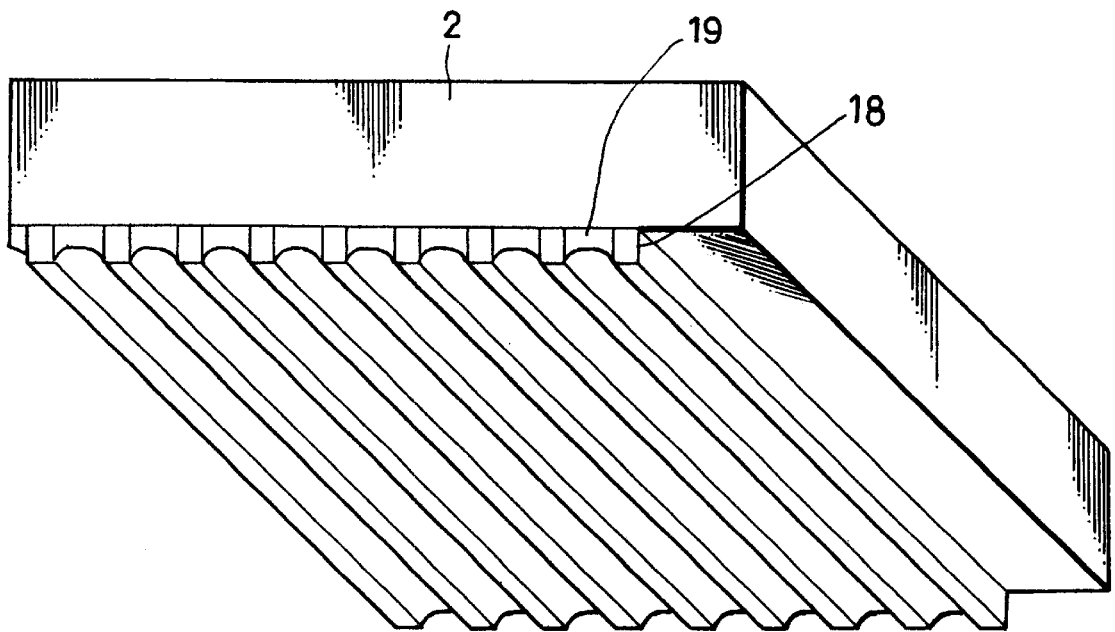
FIG. 5 is a perspective view and a cut-away side view showing a main portion of an example of the planar-type plasma-discharge display device used in the present invention partly in a cross-sectional fashion.
Figure 5:
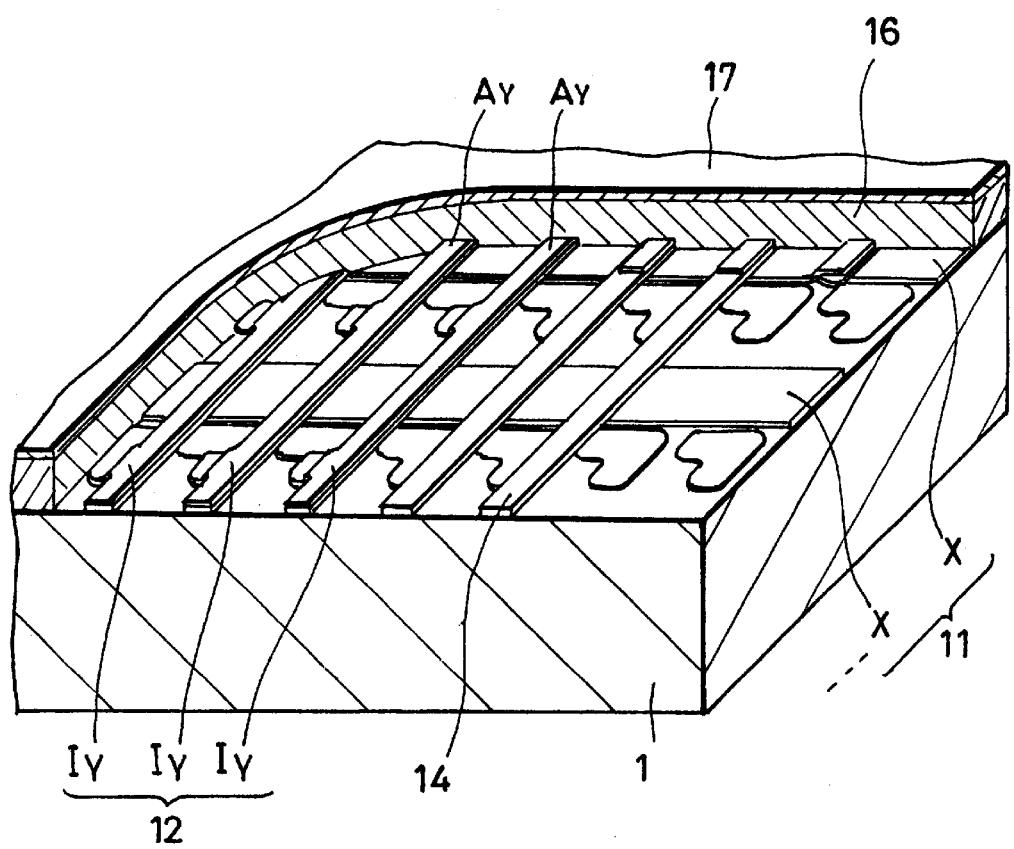

FIG. 5 is a perspective view of a main portion illustrating the inside of the display device with the first and second substrates 1 and 2 being opened.

On the inner surface of the first substrate 1, i.e. on the surface opposing the second substrate 2, there are formed a first electrode group 11 comprising the array of a plurality of row-electrode elements X and a second electrode group 12 comprising the array of a plurality of column-electrode elements Y.

Figures 6A, 6B:
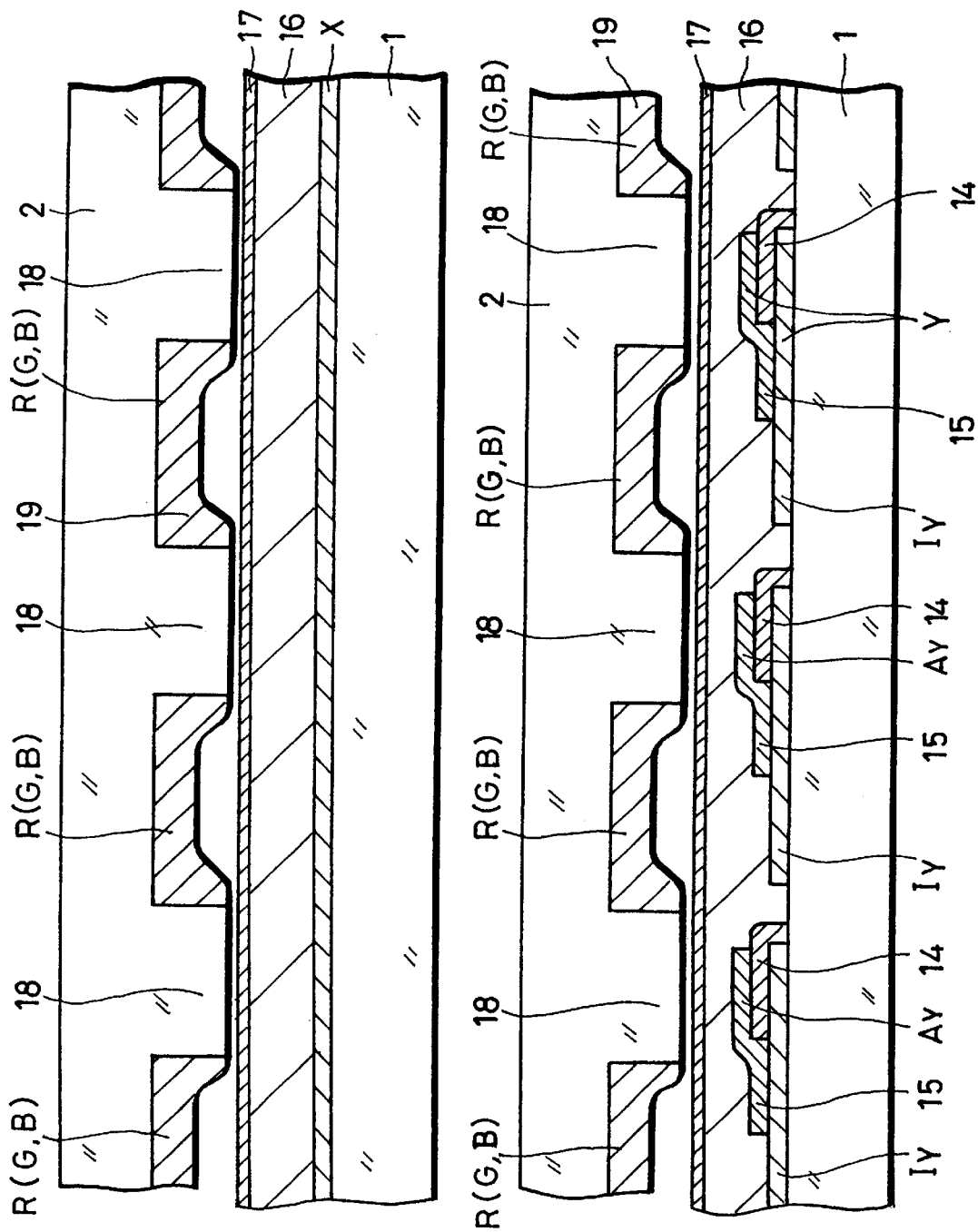
FIG. 6A is a cross-sectional view of a main portion of an example of the planar-type plasma-discharge display device.
FIG. 6B is a cross-sectional view showing a main portion of an example of the planar-type plasma-discharge display device from other plane.
Figure 7:
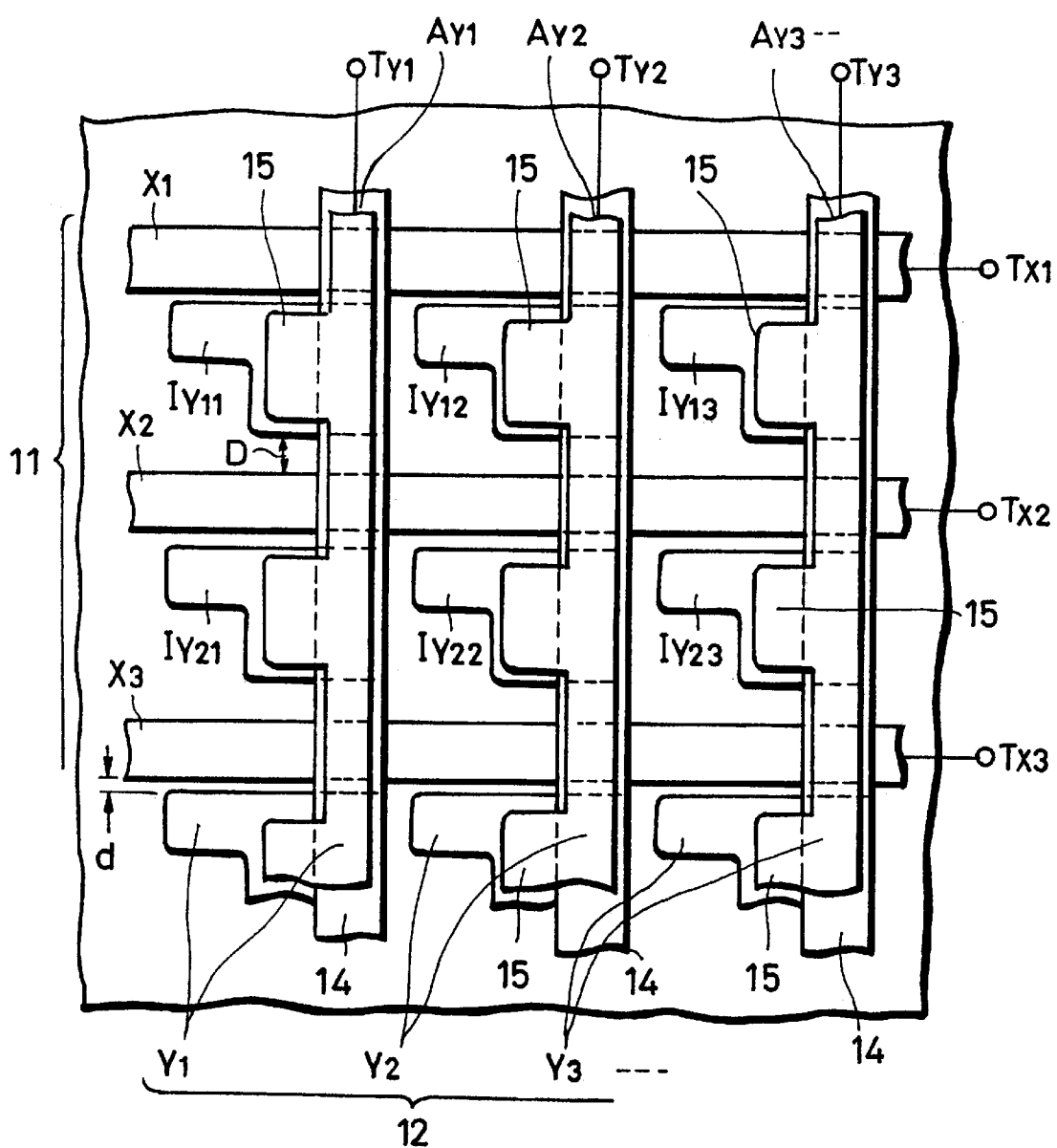
FIG. 7 is an electrode pattern diagram of an example of the plasma-discharge display device.

FIG. 6A is a cross-sectional view taken along the row direction of the row-electrode element X in the above-mentioned device according to an embodiment of the present invention. FIG. 6B is a cross-sectional view similarly taken along the row direction between the row electrode elements X. FIG. 7 is a pattern diagram showing an example of the first and second electrode groups 11 and 12 formed on the first substrate 1.

In this embodiment, as shown in FIG. 7, the first electrode group 11 is formed in such a manner that row-electrode elements $X_1$, $X_2$, $X_3$ ... of a plurality of band-like parallel electrode arrangements extended along the row direction and which are arrayed with a predetermined interval are arranged in a two-dimensional fashion.

If respective end portions, for example, of these row-electrode elements X ($X_1$, $X_2$, $X_3$ ...) are extended up to the side edge portions of the first substrate 1, then they can be exposed to the outside and served as respective row-electrode terminals $T_X$ ($T_{X1}$, $T_{X2}$, $T_{X3}$ ... ).

Also, the respective electrode elements ($Y_1$, $Y_2$, $Y_3$ ... ) of the second electrode group 12 in this embodiment comprise, as shown in FIG. 7, band-like electrode portions $A_Y$ ($A_{Y1}$, $A_{Y2}$, $A_{Y3}$ ... ) extended along the column direction and a discharge-electrode portion $I_Y$.

An insulating layer 14 made of $SiO_2$, for example, is deposited in a band-shape under each band-like electrode portion $A_Y$ across the row-electrode element X in the column direction so as to electrically insulate the band-like electrode portion from each row-electrode element X.

Moreover, if the respective end portions, for example, of these electrode portions $A_Y$ are extended to the side edge portions of the first substrate 1, then they are exposed to the outside to form respective row-electrode terminals $T_Y$ ($T_{Y1}$, $T_{Y2}$, $T_{Y3}$ ... ).

The discharge-electrode portion $I_Y$ comprises discharge-electrode portions $I_{Y11}$, $I_{Y12}$, $I_{Y13}$ ... , $I_{Y21}$, $I_{Y22}$, $I_{Y23}$ ... , $I_{Y31}$, $I_{Y32}$, $I_{Y33}$ ... disposed in one side from the respective electrode portions $A_Y$, i.e. in the left-hand side in FIG. 7 in response to the crossing portions of the respective electrode elements of the first and second electrode groups 11 and 12 and which are opposed to each of the row-electrode elements X ($X_1$, $X_2$, $X_3$ ... ) with the above-mentioned predetermined interval d.

The first electrode group 11 and the discharge-electrode portions $I_Y$ of the second electrode group 12 may be formed of the same conductive layer simultaneously.

Then, when the first electrode group 11 and the discharge-electrode portions $I_Y$ of the second electrode group 12 are formed of the same conductive layer, the discharge-electrode portions $I_Y$ of the second electrode group 12 and the electrode portions $A_Y$ are formed by different processes. In this case, as shown in FIGS. 5 to 7, a connection piece 15 is integrally formed on each electrode element portion $A_Y$ so as to be extended to the outside of the insulating layer 14 such that it directly contacts with each corresponding discharge-electrode portion $I_Y$, thereby making an electrical connection.

A dielectric layer 16 such as $SiO_2$ or the like (FIGS. 6A and 6B) is deposited on the whole surface of the first substrate 1 so as to cover the portions in which the first and second electrode groups 11 and 12 are formed except the respective row-electrode terminals $T_X$ and column-electrode terminals $T_Y$. On the dielectric layer, if necessary, there is deposited a surface layer 17 made of, for example, MgO having a small work function as compared with that of the dielectric layer 16 and which has an effect for protecting the dielectric layer 16 from being damaged by the plasma-discharge.

Although the surface layer 17 made of MgO or the like may be removed in the band-like electrode portions $A_Y$ extended in the column direction of the column electrodes Y, if the surface layer is deposited on the whole surface of the dielectric layer 16, there is then the advantage from a standpoint of simplifying the manufacturing process.

On the other hand, on the inner surface of the second substrate 2, i.e. on the surface of its side opposing the first substrate 1, there are protruded band-like partitions 18 extended in the column direction in an opposing relation to the column-electrode elements, i.e. the band-like electrode portions $A_Y$ ($A_{Y1}$, $A_{Y2}$, $A_{Y3}$ . . . ) extended in the column direction of the electrode elements Y of the second electrode group 12. The height of this partition 18 is selected in such a manner that an interval between these partitions 18 and the dielectric layer 16 or the surface layer 17 formed on the surface of the dielectric layer becomes suitable enough to avoid the plasma discharge which will be described later on.

Also, between the respective partitions 18 on the inner surface of the second substrate 2, there are formed phosphor layers 19 in which phosphors R, G and B for producing lights of red, green and blue colors, for example, are alternately coated over the wide area including the side wall surfaces thereof and the bottom surface thereof including the portions opposing the electrode elements X and Y, i.e. in a stripe fashion.

A gas is filled into the flat space between the first and second substrates 1 and 2. As the gas filled into this flat space, there may be mainly used gases of more than one kind of He, Ne, Ar, Xe, Kr, e.g., mixed gas of Ne and Xe or so-called Penning gas made of a mixed gas such as Ar and Xe.

A pressure P at which this gas is filled into the flat space may be selected in a range of from 0.3 to 5.0 atm.

According to the Paschen's law, this filled gas pressure P is selected in such a manner that, when a discharge-start voltage $V_s$ is selected to be a predetermined voltage, e.g. Paschen's minimum value, a product of this pressure and the distance d between the discharge-electrodes, i.e. distance (hereinafter referred to as a discharge-electrode distance) between the respective row-electrode elements X ($X_1$, $X_2$, $X_3$ . . . ) and the discharge-electrode portions $I_Y$ ($I_{Y11}$, $I_{Y12}$, $I_{Y13}$ . . . , $I_{Y21}$, $I_{Y22}$, $I_{Y23}$ . . . , $I_{Y31}$, $I_{Y32}$, $I_{Y33}$ . . . ), i.e. P•d becomes constant. However, when the discharge-start voltage $V_S$ is selected to be the Paschen's minimum value, the discharge-electrode distance d may allow the fluctuation of ± several 10s of percents relative to the distance d determined at that time. Also, when the discharge-start voltage $V_S$ is selected to be other value than the Paschen's minimum value, the discharge-electrode distance may have a tolerance of about ± 30% relative to the discharge-electrode distance d determined at that time in actual practice.

Then, the discharge-electrode distance d may be selected to be less than 50 $\mu$m, e.g. 5 to 20 $\mu$m, or further, a narrow interval such as less than 5 $\mu$m and 1 $\mu$m and so on.

Figure 8A:
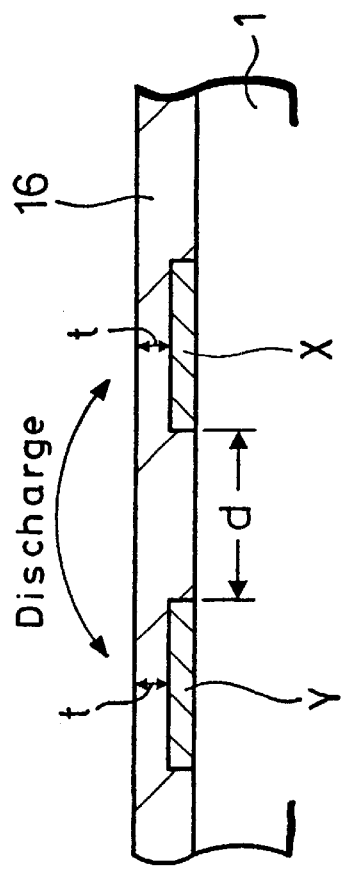
FIGS. 8A and 8B are each a diagram used to explain the manner in which a distance between discharge electrodes is selected.
Figure 8B:
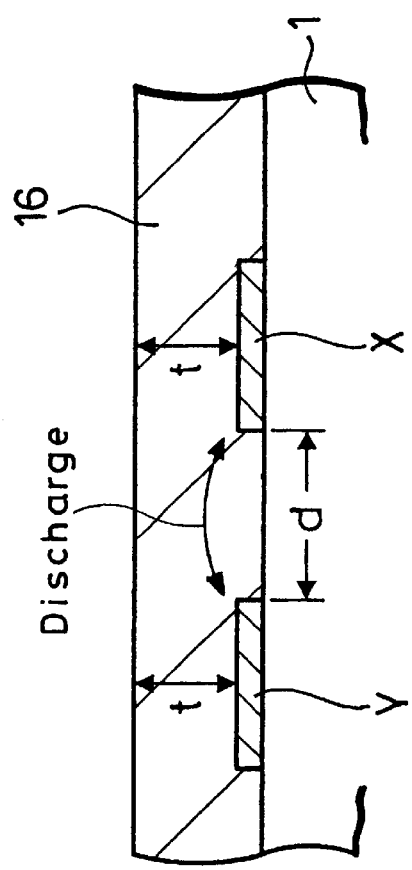

On the other hand, this discharge-electrode distance d should also be selected in relation to a thickness t of the dielectric layer 16. That is, as shown by its discharge state in FIG. 8A, in order to effect the plasma-discharge above the dielectric layer 16, the discharge should be effected through the dielectric layer 16 in the thickness direction thereof. As shown in FIG. 8B, the discharge should be avoided from being effected between the two electrode elements X and Y in the dielectric layer 16. To this end, if a permittivity of the surface layer 17 is sufficiently lower than that of the dielectric layer 16, then a relationship of 2t<d should preferably be selected.

Then, a distance D between the electrodes, which do not comprise a pair of discharge electrodes, in the portions other than the opposed portions of the row-electrode elements X ($X_1$, $X_2$, $X_3$ . . . ) serving as the opposing electrodes comprising respective pairs of discharge electrodes and the discharge-electrode portions $I_Y$ ($I_{Y11}$, $I_{Y12}$, $I_{Y13}$ . . . , $I_{Y21}$, $I_{Y22}$, $I_{Y23}$ . . . , $I_{Y31}$, $I_{Y32}$, $I_{Y33}$ . . . ) of the electrode element Y is selected to be larger than or sufficiently larger than the discharge-electrode distance d, i.e. D>d or D >>d.

Then, an operation of the display device thus arranged will be described. In this display device, if an AC voltage higher than the discharge-start voltage is applied across the predetermined, e.g. selected row-electrode elements $X_1$, $X_2$, $X_3$ . . . and the column-electrode elements $Y_1$, $Y_2$, $Y_3$ . . . of the first and second electrode groups 1 and 2 serving as the pairs of the discharge electrodes, in the above-mentioned example, across the respective row-electrode elements $X_1$, $X_2$, $X_3$ . . . and the respective discharge-electrode portions $I_{Y11}$, $I_{Y12}$, $I_{Y13}$ . . . , $Y_{21}$, $I_{Y22}$, $I_{Y23}$ . . . $Y_{31}$, $I_{Y32}$, $I_{Y33}$ . . . , then the plasma-discharge may be generated in the gas space between the pair of the discharge electrodes applied with this voltage above the dielectric layer 16 (on the surface layer when the surface layer 17 is formed) and the second substrate 2.

That is, in this case, the portion of the discharge-electrode portions $I_Y$ of each column-electrode element Y opposing each row-electrode element X with the distance d and the nearby portion are served as the unit discharge regions.

Then, when the plasma discharge is generated as described above, for example, resultant ultraviolet rays excite the phosphors R, G, B disposed in the discharge space of this unit discharge region to produce lights of red, green and blue colors.

If a predetermined voltage is sequentially applied to the row-electrode elements $X_1$, $X_2$, $X_3$, for-example, and in synchronism therewith and the discharge-start voltage is applied to the respective column-electrode elements $Y_1$, $Y_2$, $Y_3$ . . . in response to display information, then the plasma discharge is generated in the unit discharge region corresponding to target display information to excite the phosphors R, G, B to produce lights of red, green and blue colors so that a color display may be made in which the adjacent phosphors R, G, B are used as one pixel, i.e. one color picture element.

In this case, each unit discharge region is restricted with respect to the column direction by the voltage applied to the row-electrode elements $X_1$, $X_2$, $X_3$ . . . With respect to the row direction, each unit discharge region is restricted because the plasma-discharge is suppressed by the existence of the partition 18, thereby making it possible to avoid the occurrence of cross-talk.

An image displayed on the above-mentioned planar plasma-discharge display device is viewed by a viewer from the first substrate 1 side or the second substrate 2 side. In this case, at least the substrate 1 or 2 from which the displayed image is viewed is made of the transparent substrate through which emitted display light is passed, e.g. the glass substrate as mentioned before. When both substrates 1 and 2 are made of the transparent substrate, if a light reflection film or light-shielding film (not shown) such as Al-vapor deposition film or the like is formed on the inner surface of the substrate 2 or 1 on the opposite side of the side through which the displayed image is viewed before the respective electrode groups or the phosphor layers are formed, then the emitted light may be effectively introduced into the viewing side, and also external incident light from the rear surface side may be shielded, thereby making it possible to improve a contrast.

Also, when a displayed image is viewed from the first substrate 1 side on which the electrode groups are formed, the respective electrode elements of the first and second electrode groups 11 and 12 are made of a transparent conductive layer, e.g. ITO (each compound oxide of In and Sn).

Figure 9:
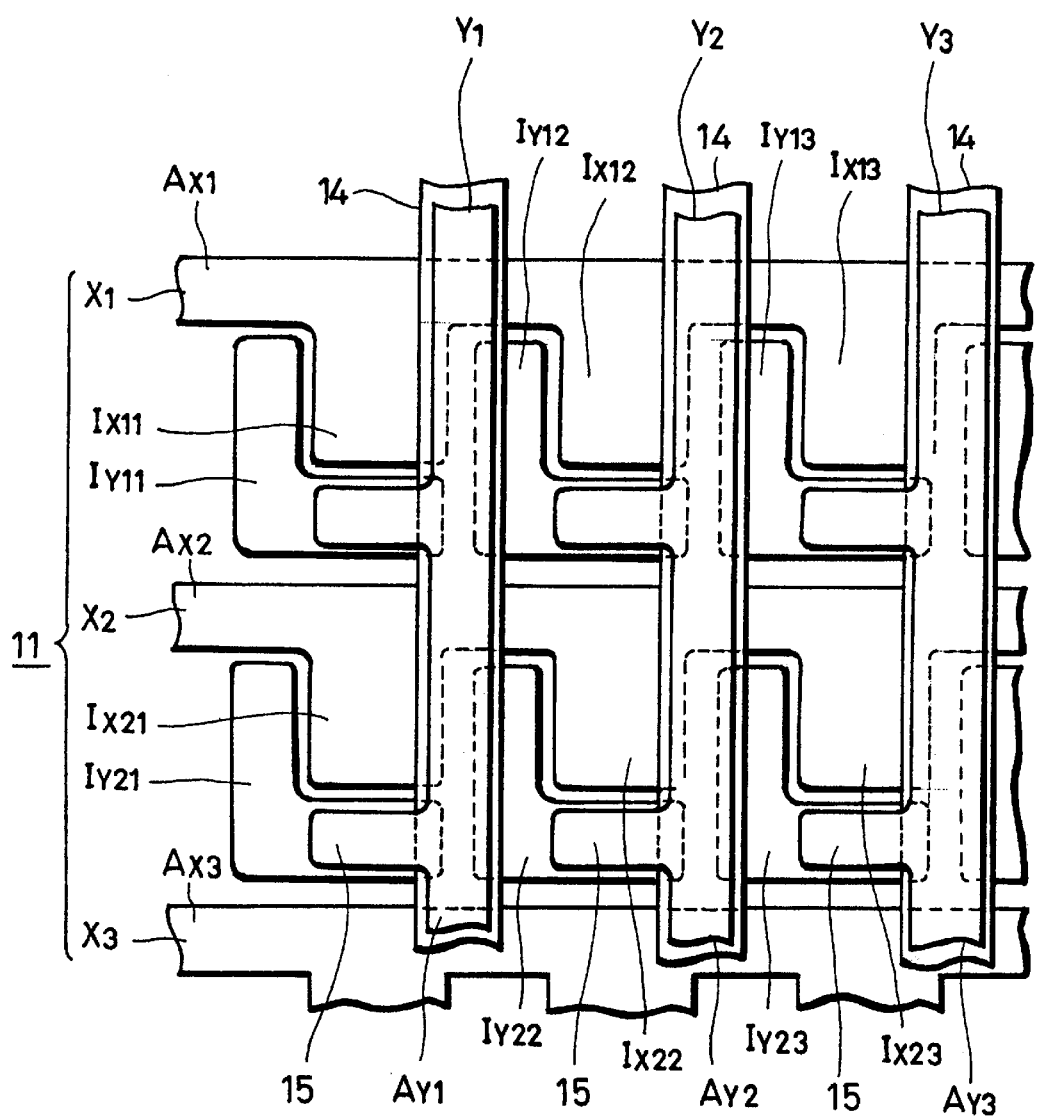
FIG. 9 is an electrode pattern diagram of another example of the plasma-discharge display device.
Figure 10:
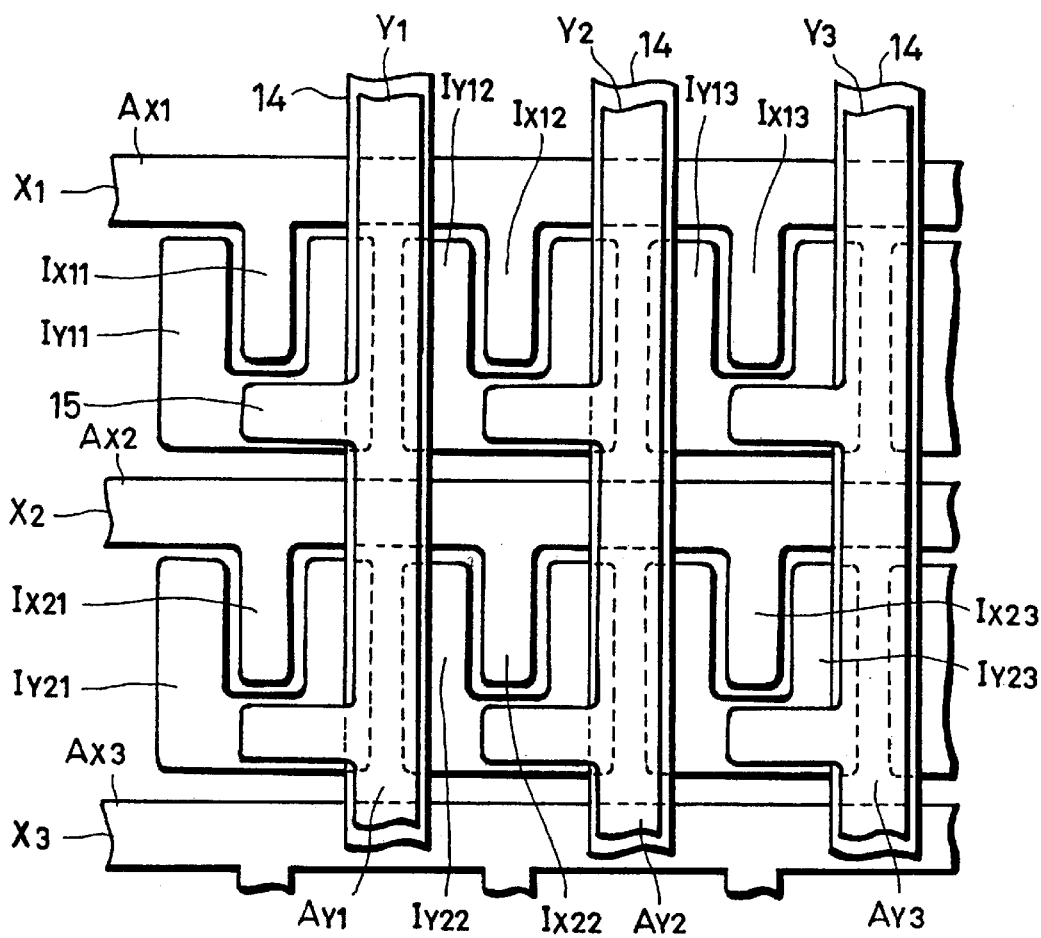
FIG. 10 is an electrode pattern diagram of the other example of the plasma-discharge display device.
Figure 11:
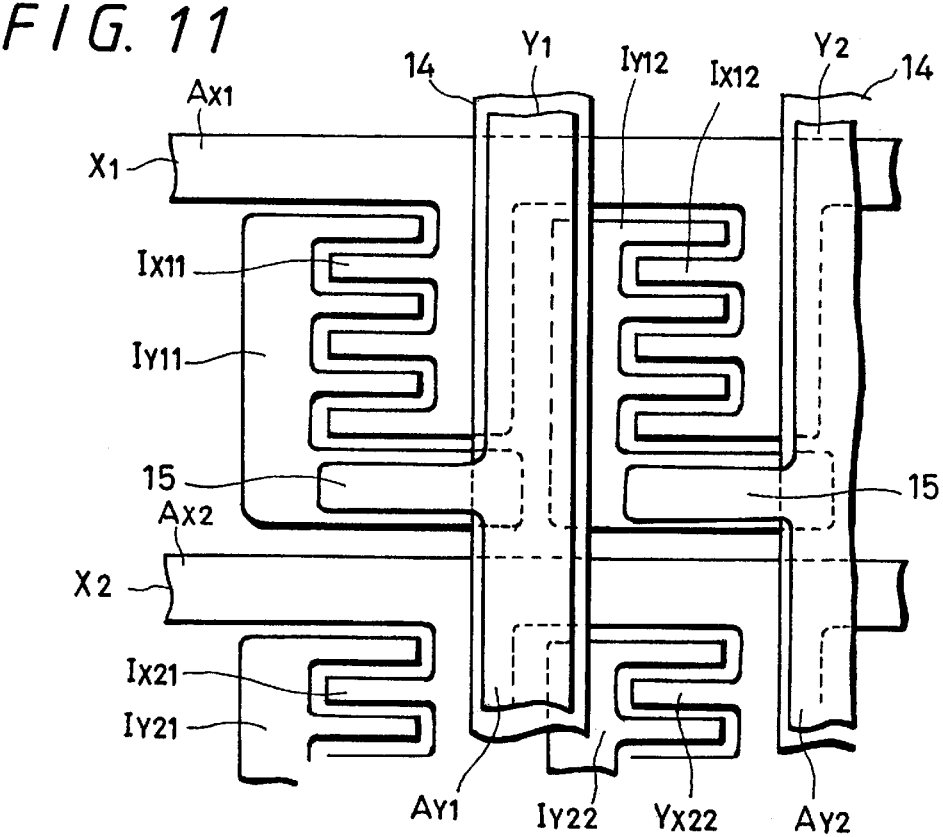
FIG. 11 is an electrode pattern diagram of the other example of the plasma-discharge display device.

In the above-mentioned example, as shown by the pattern diagram in FIG. 7, only each electrode element Y of the second electrode group 12 is formed of the discharge-electrode portion $I_Y$ and the feeding electrode portion $A_Y$, and the electrode element X of the first electrode group 11 is formed of the band-like pattern in which the so-called feeding portion and the portion serving as the discharge-electrode are made common. In order to make it possible to increase the opposing length between the discharge-electrodes of the first and second electrode groups 11 and 12 such that the area of the plasma-discharge region is made large to increase the brightness of emitted light high, as shown in FIGS. 9 to 11, by way of example, the electrode elements X of the first electrode group 11 may be comprised of so-called feeding electrode portions $A_X$ ($A_{X1}$, $A_{X2}$, $A_{X3}$ ...) of a band-shape extended in the row direction and discharge-electrode portions $I_X$ ($I_{X11}$, $I_{X12}$, $I_{X13}$ ..., $I_{X21}$, $I_{X22}$, $I_{X23}$ ... $I_{X31}$, $I_{X32}$, $I_{X33}$ ...) extended in the column direction.

Then, as shown in FIG. 9, for example, the discharge-electrode portion $I_{X1}$ of each electrode element X of the first electrode group 11 may be formed as substantially a rectangular pattern, and the discharge-electrode portion $I_Y$ of each electrode element Y of the second electrode group 12 may be shaped as an L-letter configuration so as to oppose the two sides of the rectangular pattern with the distance d.

Alternatively, as shown in FIG. 10, the discharge-electrode portion $I_X$ of each electrode element X of the first electrode group 11 may be formed as substantially an I-letter configuration and the discharge-electrode portion $I_Y$ of each electrode element Y of the second electrode group 12 may be shaped as a U-letter configuration so as to encircle the above-mentioned pattern in an opposing fashion with the distance d.

Furthermore, alternatively, as shown in FIG. 11, for example, the discharge-electrode portions $I_X$ and $I_Y$ of the respective electrode elements X and Y of the first and second electrode groups 11 and 12 maybe shaped as zigzag patterns which are opposed to each other with the distance d.

Incidentally, in FIGS. 9 to 11, elements and parts corresponding to those of FIG. 7 are marked with the same references and an overlapping explanation will be omitted.

Then, in order to facilitate the understanding of the display device thus arranged, an example of a manufacturing method thereof will be described. In this example, the row-electrode elements X ($X_1$, $X_2$, $X_3$ ...) and the discharge-electrode portions $I_Y$ ($I_{Y11}$, $I_{Y12}$, $I_{Y13}$ ..., $I_{Y21}$, $I_{Y22}$, $I_{Y23}$ ... $I_{Y31}$, $I_{Y32}$, $I_{Y33}$ ...) of the column-electrode elements Y ($Y_1$, $Y_2$, $Y_3$ ...) are made of the same conductive layer, namely, by the same process.

As this manufacturing method, there will be initially described a manufacturing process concerning the first substrate 1. There is prepared the first substrate 1 made of a glass substrate, for example. A photo-resist layer is coated on the whole surface of one major surface and this resist is subjected to a patterning. In this patterning, the photo-resist layer is pattern-exposed and developed so that the photo-resist layers on the portions in which each electrode element X of the first electrode group 11 and the discharge-electrode portions $I_Y$ of the electrode element Y of the second electrode group 12 are formed finally may be removed.

Then, a conductive layer comprising each electrode element X of the first electrode group 11 and the discharge-electrode portions $I_Y$ of each electrode element Y of the second electrode group 12 is formed on the whole surface of the first substrate including the removed portion of the photo-resist layer by a vapor deposition.

This conductive layer may be made of ITO of the transparent conductive layer, for example, or a metal layer of more than one kind such as Al, Cu, Ni, Fe, Cr, Zn, Au, Ag, Pb and so on or a conductive layer of Cr/Al laminated structure having an Al layer and a surface layer thereon such as a Cr layer or the like for preventing the Al layer from being oxidized or a conductive layer of Cr/Al/Cr multilayer structure having an under layer made of a Cr layer having an excellent deposition property relative to the glass substrate, for example, e.g. under layer made of a Cr layer.

The photo-resist layer is stripped by its stripper, and the conductive layer formed on the photo-resist layer is also removed, i.e. lifted off, together with the photo-resist layer, thereby resulting in the conductive layer being patterned.

Figure 12:
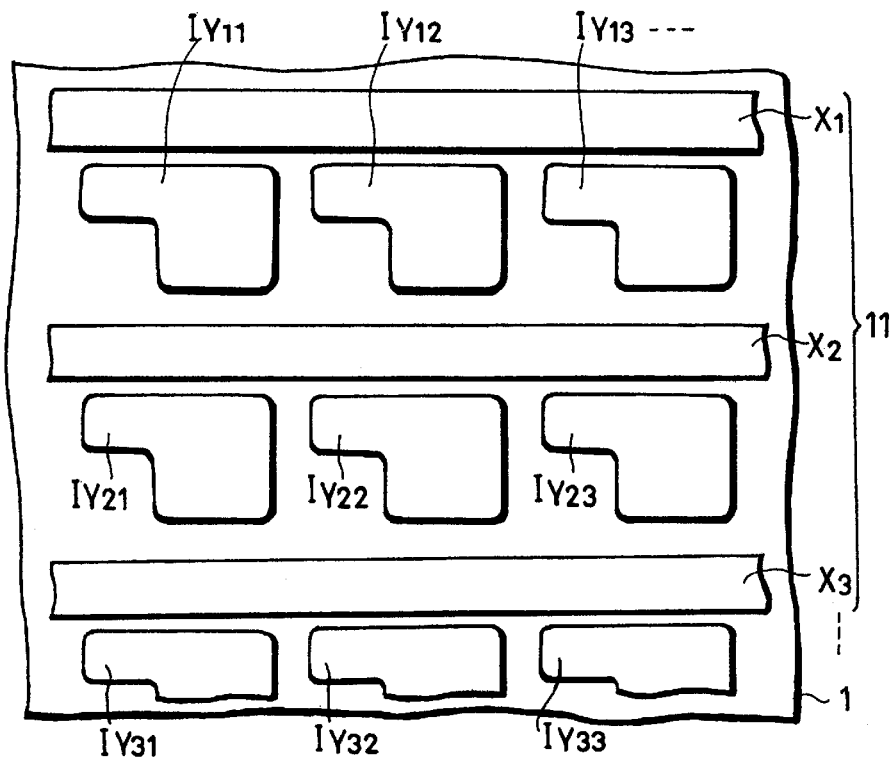
FIG. 12 is a plan view of a main portion of a first substrate in a process of an example of a method of manufacturing an example of the plasma-discharge display device.

In this manner, the conductive layer is patterned so that, as shown in FIG. 12, for example, only each electrode element X of the first electrode group 11 and the discharge-electrode portions $I_Y$ of each electrode element Y of the second electrode group 12 are formed.

Figure 13:
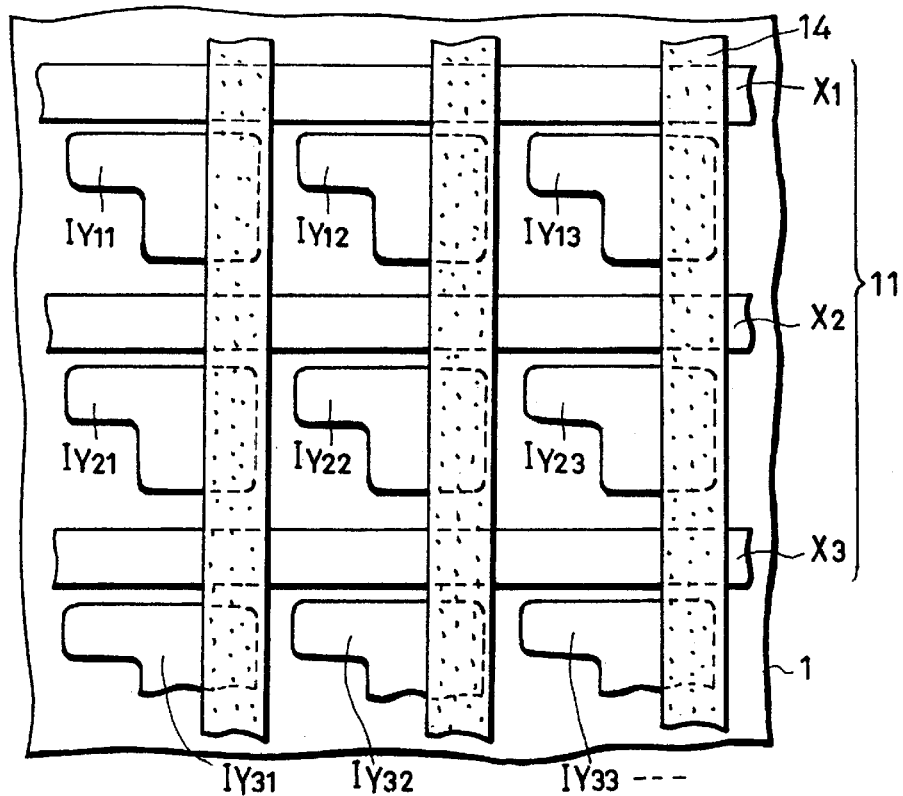
FIG. 13 is a plan view of a main portion of a first substrate in a process of an example of a method of manufacturing an example of the plasma-discharge display device.

Then, as shown in FIG. 13, the insulating layer 14 is formed. When this insulating layer 14 is formed, a photo-sensitive glass paste, for example, comprising the insulating layer is coated on the whole surface of the first substrate 1 on which each electrode element X of the first electrode group 11 and the discharge-electrode portions $I_Y$ of each electrode element Y of the second electrode group 12, and the resultant product is treated by heat-treatment at 80° for 20 minutes. Thereafter, by pattern-exposing and developing this glass layer, the band-like pattern is formed on each one side edge of the discharge-electrode portions $I_Y$ ($I_{Y11}$, $I_{Y12}$, $I_{Y13}$ ... $I_{Y21}$, $I_{Y22}$, $I_{Y23}$ ... $I_{Y31}$, $I_{Y32}$, $I_{Y33}$ ...) arrayed on the same column so as to cross the respective electrode elements X ($X_1$, $X_2$, $X_3$ ...) Thereafter, the resultant product is baked. In this manner, there may be formed the insulating layer 14.

Then, there are formed the electrode portions $A_Y$ ($A_{Y1}$, $A_{Y2}$, $A_{Y3}$ ...) of the second electrode group 12 and connection pieces 15 that are extended therefrom shown in FIG. 7. When the above-mentioned electrode portions and connection pieces are formed, they may be formed by a lift-off method. Specifically, also in this case, the photo-resist layer is coated on the whole surface of the first substrate 1 and the photo-resist is patterned for pattern-exposure and development. Thereafter, the conductive layer made of Al, for example, is formed on the whole surface by vapor deposition or the like. Then, the photo-resist layer is stripped off and the conductive layer formed on the photo-resist layer is lifted-off together with this photo-resist layer, thereby resulting in the electrode portions $A_Y$ ($A_{Y1}$, $A_{Y2}$, $A_{Y3}$ . . . ) of the second electrode group 12 and the connection pieces 15 extended from the above electrode portions being formed at the same time.

In this manner, the first and second electrode groups 11 and 12 are formed.

Thereafter, the dielectric layer 16 such as $SiO_2$ or the like is formed on the whole surface of the substrate except the terminal deriving portions such as $T_{X1}$, $T_{X2}$, $T_{X3}$ . . . $T_{Y1}$, $T_{Y2}$, $T_{Y3}$ . . . formed of the end portions of the respective electrode elements X and Y, i.e. the outer peripheral portion of the substrate by a CVD (Chemical Vapor Deposition) method and on which there is formed the surface layer 17 such as MgO or the like by the vapor deposition, for example.

A manufacturing method concerning the second substrate 2 will be described next. Also in this case, there is prepared the second substrate 2 made of the glass substrate, for example. Then, the above-mentioned partition 18 is formed on one major surface thereof. To this end, initially, a photo-resist layer, for example, is coated on or a laminate glass material sheet, e.g. GREEN SHEET (trade name of glass material sheet manufactured by Du Pont Corporation) is bonded to the whole surface of the second substrate 2 on which the partition 18 is formed and pre-baked at 210° C. or 410° C.

Thereafter, the photo-resist layer is coated on the resultant product, and the photo-resist layer is left on the portion on which the partition 18 is formed, i.e. as the pattern of the partition 18 and the other portions are removed by the pattern-exposure and development.

Then, this photo-resist layer is used as a mask, and the portion in which the photo-resist layer is formed is left and other portions are removed by the powder-beam process or so-called sand-blast.

Thereafter, the resultant product is sintered at 600° C., for example. According to this treatment, the photo-resist layer is lost and the partition 18 is made of the glass.

Red, green and blue phosphors R, G and B are formed at every two concave portions, for example, between the respective partitions 18 by sequentially coating phosphor slurries on the inner surface of the second substrate 2 in which the stripe-like partitions 18 are formed as described above, and baked at 430° C., for example, thereby resulting in the phosphor layer 19 being formed.

As described above, the first substrate 1 on which the first and second electrode groups 11 and 12 are formed and the second substrate 2 on which the partitions 18 and the phosphor layers 19 are formed are formed. These first and second substrates are opposed with a predetermined interval under the condition that the respective electrode portion $A_Y$ of each electrode element Y of the second electrode group 12 and the respective partitions 18 of the second substrate 2 are opposed to each other. Then, the peripheral portions thereof are sealed by a glass frit at 430° C., for example.

The frit positions in this case are selected to be the positions at which the terminal portions $T_X$ and $T_Y$ of respective electrode terminals are led out to the outside.

The flat space formed between the first and second substrates 1 and 2 as described above is evacuated for two hours under the condition that it is heated at 380° C., for example. The above-mentioned gas is filled into this flat space at a predetermined gas pressure. In this manner, there is formed the planar type plasma-discharge display device.

When a high-temperature treatment such as the above-mentioned baking at 600° C., for example, is carried out after the electrode groups of the under layer, in this case, the first and second electrode groups 11 and 12 were formed, if the conductive layers formed before this high-temperature treatment, i.e. in the above-mentioned example, the respective electrode elements X of the first electrode group 11 and the respective discharge-electrode portions $I_Y$ of the respective electrode elements Y of the second electrode group 12 are made of Al, for example, there arises a problem that the deterioration of characteristics such as oxidization of Al or the like occurs. In this case, as mentioned before, this conductive layer should preferably be formed as the conductive layer of the multilayer structure in which Cr for protecting Al and forming a stable bad conductor layer by oxidization is formed on the Al layer.

While the respective electrode groups 11 and 12 are formed by the lift-off method as described above, the present invention is not limited to the above-mentioned example, and various methods may be applied such as when the conductive layer is formed on the whole surface and the electrode groups are formed by pattern-etching this conductive layer according to photolithography.

Figure 14:
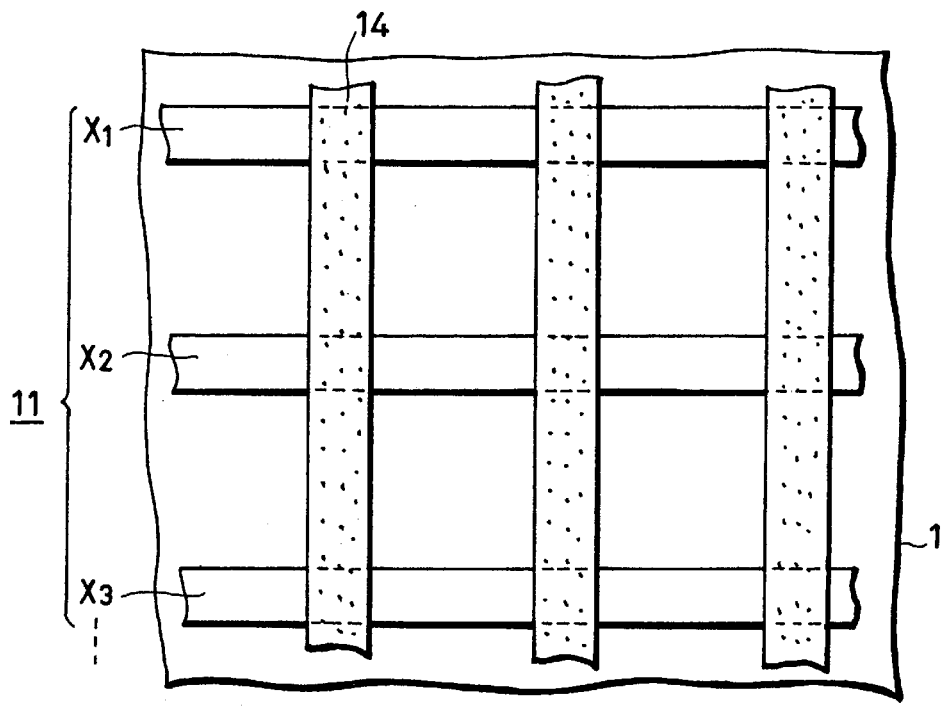
FIG. 14 is a plan view of a main portion of a first substrate in a process of the other example of a method of manufacturing an example of the plasma-discharge display device.
Figure 15:
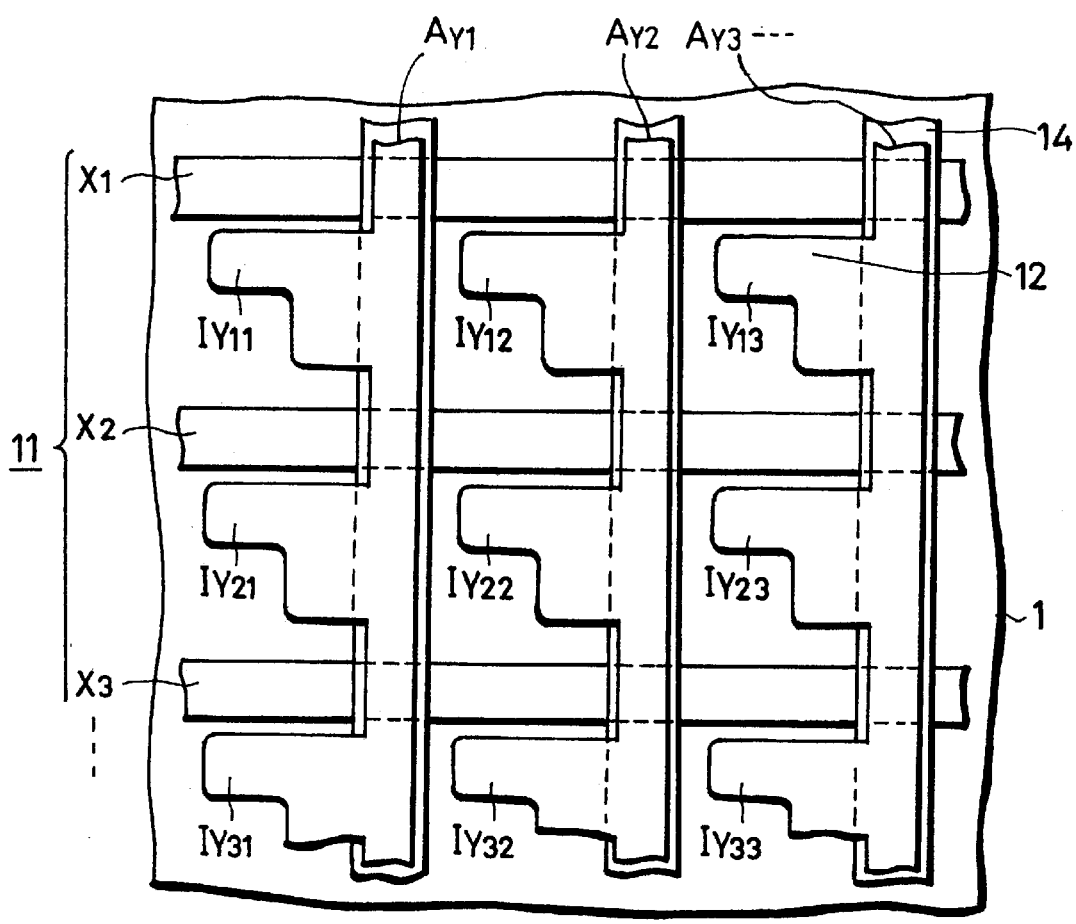
FIG. 15 is a plan view of a main portion of a first substrate in a process of the other example of a method of manufacturing an example of the plasma-discharge display device.

Incidentally, while the electrode elements X of the first electrode group 11 and the discharge-electrode portions $I_Y$ of the electrode elements Y of the second electrode group 12 are made of the same conductive layer by the same process, the discharge-electrode portion $I_Y$ of the electrode elements Y of the second electrode group 12 and the so-called feeding electrode portions $A_Y$ may be made of the same conductive layer by the process different from that of the first electrode group 11. Specifically, in this case, by a method similar to the above-mentioned method, only the electrode elements X of the first electrode group 11 whose pattern is shown in FIG. 14 are formed without forming the discharge-electrode portions $I_Y$ of the second electrode group 12. Thereafter, the above-mentioned insulating layer 14 is formed. Thereafter, as shown in FIG. 15, when the aforementioned electrode portions $A_Y$ of the electrode elements Y of the second electrode group 12 are formed, the electrode elements are extended from the electrode portions $A_Y$ to form the discharge-electrode portions $I_Y$. In this case, the connection pieces 15 are omitted.

While the insulating layer 14 and the dielectric layer 16 are formed respectively as described above, they may be formed of the same material layer, e.g. $SiO_2$ or glass layer or the like. In this case, when the above-mentioned insulating layer 14 is formed, the dielectric layer 16 also is formed at the same time. Contact holes in which the respective electrode portions $A_Y$ are contacted with the discharge-electrode portions $I_Y$ of the under layer are formed at the portions in which the respective discharge-electrode portions $I_Y$ of the electrode elements Y of the second electrode group 12 and the electrode portions $A_Y$ overlap with each other.

The above-mentioned respective manufacturing methods are not limited to the pattern of FIG. 7 and may of course be applied to the case in which the electrode elements X ($X_1$, $X_2$, $X_3$ . . . ) of the first electrode group 11 shown in FIGS. 9 to 11, for example, are comprised of the electrode portions $A_X$ ($A_{X1}$, $A_{X2}$, $A_{X3}$ . . . ) and the discharge-electrode portions $I_X$ ($I_{X11}$, $I_{X12}$, $I_{X13}$ . . . , $I_{X21}$, $I_{X22}$, $I_{X23}$ . . . , $I_{X31}$, $X_{32}$, $I_{X33}$ . . . ) extended therefrom in the column direction.

While the display device is arranged so as to be driven by an AC voltage in the example described above, the present invention is not limited thereto and the display device may be arranged so as to be driven by a DC voltage. In this case, the dielectric layer 16 and the surface layer 17 are not formed. Then, in the case of the DC discharge, since it is customary that the electrode on the cathode side is oxidized and the electrode on the anode side is reduced by the discharge, the electrode elements comprising the first or second electrode group 11 or 12 serving as the cathode side are made of an oxide metal such as ITO, $SnO_2$, $In_2O_3$, or the like and the electrode elements comprising the second or first electrode group 12 or 11 serving as the anode side are made of metal electrodes, e.g.

Al, Cu, Ni, Fe, Cr, Zn, Au, Ag, Pb or the like or alloy of more than one kind of these metals.

Therefore, in this case, it is not preferable that the first electrode group 11 and the second electrode group 12 are formed of the same conductive layer. In this case, the respective electrode elements Y of the second electrode group 12 are formed in such a manner that the electrode portions $A_Y$ and the discharge portions $I_Y$ thereof are formed of the same conductive layer.

Also, when the display device is arranged so as to be operated by either the AC voltage or the DC voltage, if the electrode X of the first electrode group 11 is formed of the oxide electrode such as the transparent electrode or the like, then its resistivity is generally large. Accordingly, in this case, a conductive layer such as Al, Ni and Cu or the like having an excellent conductivity should preferably be deposited on one side edge extended in the row direction along the band-like electrode element.

Figure 16:
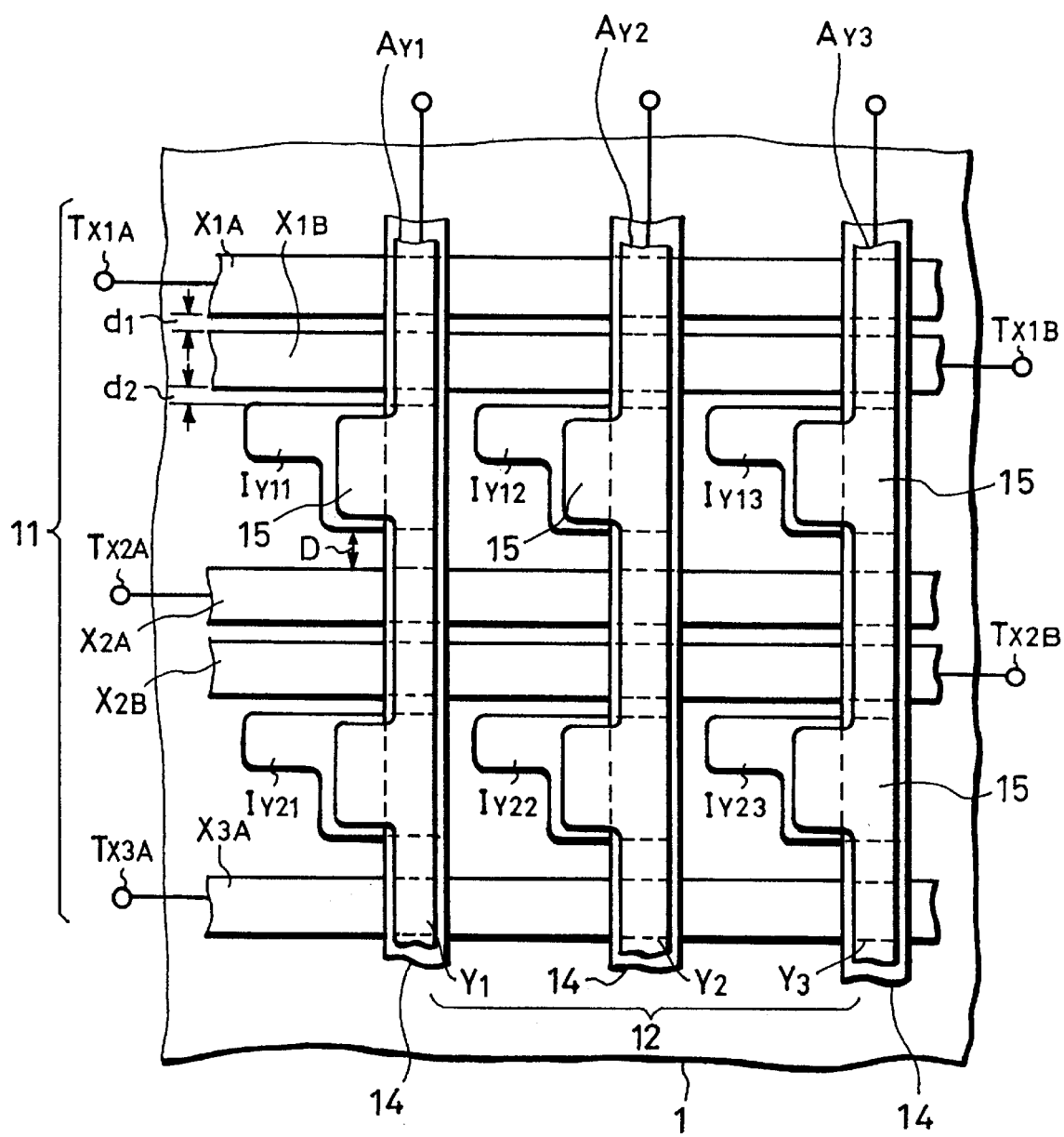
FIG. 16 is an electrode pattern diagram of the other example of the plasma-discharge display device.

Also, FIG. 16 shows the electrode layout pattern of the plasma-discharge display device for producing images of lights of the above-mentioned respective colors, i.e. red, green and blue colors according to a further embodiment of the present invention. In this embodiment, the respective electrode elements X ($X_1$, $X_2$, $X_3$ ... ) of the first electrode group 11 are comprised of the pairs of discharge-maintenance electrodes $X_{1A}$ and $X_{1B}$, $X_{2A}$ and $X_{2B}$, $X_{3A}$ and $X_{3B}$ ... Discharge-electrode portions $I_Y$ ($I_{Y11}$, $I_{Y12}$, $I_{Y13}$ ... , $I_{Y21}$, $I_{Y22}$, $I_{Y23}$ ... , $I_{Y31}$, $I_{Y32}$, $I_{Y33}$ ... ) of the respective electrode elements Y ($Y_1$, $Y_2$, $Y_3$ ... ) of the second electrode group 12 serving as the discharge-electrode start portions for starting the discharge are disposed in an opposing relation to one of the electrode elements $X_B$ ($X_{1B}$, $X_{2B}$, $X_{3B}$ ... )

In FIG. 16, like elements and parts corresponding to those of FIG. 7, for example, are marked with the same reference numerals and an overlapping explanation will be omitted. In this arrangement, each interval $d_1$ between the pairs of discharge-maintenance electrodes $X_{1A}$ and $X_{1B}$, $X_{2A}$ and $X_{2B}$, $X_{3A}$ and $X_{3B}$ and an interval $d_2$ between one discharge-maintenance electrodes $X_B$ ($X_{1B}$, $X_{2B}$, $X_{3B}$ ... ) and opposing discharge-electrode portions $I_Y$ ($I_{Y11}$, $I_{Y12}$, $I_{Y13}$ ... , $I_{Y21}$, $I_{Y22}$, $I_{Y23}$ ... , $I_{Y31}$, $I_{Y32}$, $I_{Y33}$ ... ) are selected to be the aforementioned interval d. Then, according to this arrangement, the interval D between the electrodes in which the discharge-start or discharge-maintenance is not affected is selected so as to satisfy D>d or D >>d similar to that mentioned before.

Also in the planar type plasma-discharge display device thus arranged, similarly to FIG. 6, on the side of the second substrate 2 opposing the first substrate 1, the partitions 18 are formed along the electrode portions $A_Y$ ($A_{Y1}$, $A_{Y2}$, $A_{Y3}$ ... ) of each electrode element Y of the second electrode group 12. The phosphor layers 19 coated with any single color of the phosphors R, G and B of red, green and blue single colors are formed on the side surface of these partitions 18 and over the groove bottom portions therebetween.

When the plasma-discharge display device thus arranged is driven, a voltage of a magnitude such that the discharge cannot be started substantially but the discharge can be maintained once the discharge is started is applied between the respective pairs of the discharge-maintenance electrodes $X_{1A}$ and $X_{1B}$, $X_{2A}$ and $X_{2B}$, $X_{3A}$ and $X_{3B}$ ... Under this state, the discharge-start voltage is applied to the discharge-electrode portions $I_Y$ ($I_{Y11}$, $I_{Y12}$, $I_{Y13}$ ... $I_{Y21}$, $I_{Y22}$, $I_{Y23}$ ... , $I_{Y31}$, $I_{Y32}$, $I_{Y33}$ ... ) According to this driving, the discharge is generated between the discharge-electrode portions $I_Y$ to which this discharge-start voltage is applied and one discharge-maintenance electrodes $X_B$ ($X_{1B}$, $X_{2B}$, $X_{3B}$ ... ) opposing thereto, whereby the discharge is started between the discharge-maintenance electrode $X_B$ in which this discharge was started and the discharge-maintenance electrodes forming the pair therewith and this discharge state is maintained.

Then, also in the arrangement shown in FIG. 16, electrodes and electrode portions may be formed by the aforementioned manufacturing method. Specifically, the pairs of the discharge-maintenance electrodes $X_{1A}$ and $X_{1B}$, $X_{2A}$ and $X_{2B}$, $X_{3A}$ and $X_{3B}$ ... comprising the electrode elements X of the first electrode group 11 and the discharge-electrode portions $I_Y$ ($I_{Y11}$, $I_{Y12}$, $I_{Y13}$ ... , $I_{Y21}$, $I_{Y22}$, $I_{Y23}$ ... , $I_{Y31}$, $I_{Y32}$, $I_{Y33}$ ... ) of the second electrode group may be formed by patterning the same conductive layer through the same process.

Figure 17:
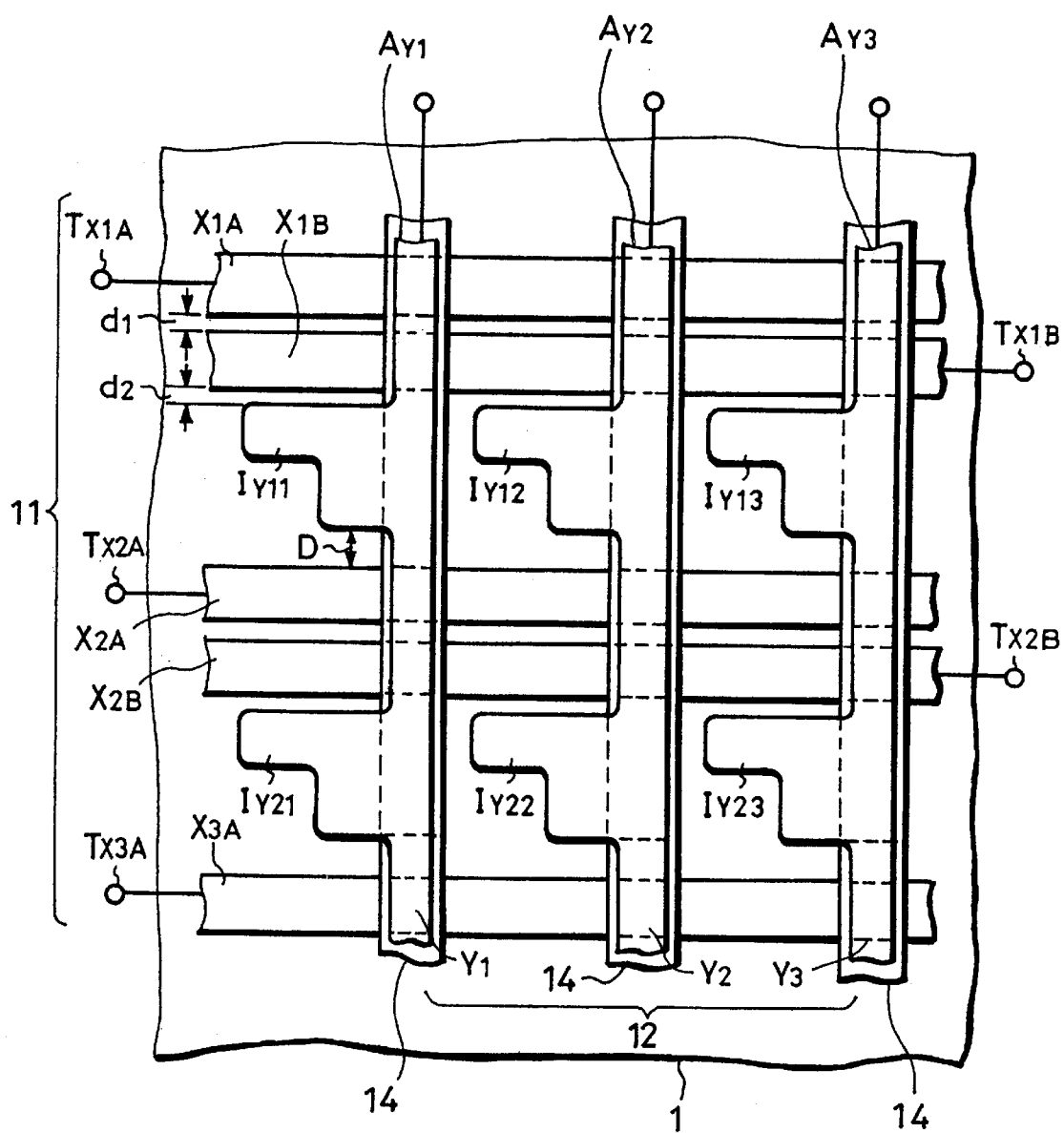
FIG. 17 is an electrode pattern diagram of a further example of the plasma-discharge display device.

However, also in the plasma-discharge display device thus arranged, as shown by an example of its electrode pattern in FIG. 17, similarly as described in connection with FIG. 15, for example, the first electrode group 11 and the second electrode group 12 may be formed of conductive layers by different processes. In this case, the connection pieces 15 are omitted. Also in FIG. 17, elements and parts corresponding to those of FIGS. 7 and 15 are marked with the same references and an overlapping explanation will be omitted.

Moreover, also in the plasma-discharge display device in which the pair of discharge-maintenance electrodes are provided, the layout pattern of the respective electrode elements may be changed variously.

According to the above-mentioned respective plasma-discharge display devices, since the first and second electrode groups 11 and 12 are formed on the common substrate, in the above-mentioned example, the first substrate 1 comprising the flat container, the interval between these electrodes may be set accurately so that the display device having an excellent homogeneity and a high accuracy may be manufactured stably with ease.

Then, as described above, since the first and second electrode groups 11 and 12 serving as the respective discharge electrodes are formed on the common substrate, the distances ($d_1$, $d_2$) between the discharge electrodes and the interval between the discharge electrodes obtained when these electrodes are formed on the opposing substrates, i.e. discharge space or the like can be avoided from being restricted with each other, and a freedom in selecting the distances and the intervals may be increased, thereby making it possible to simplify the optimum design and the manufacturing process.

Moreover, since the discharge electrodes and the phosphor layers are formed on the different substrates 1 and 2, the phosphors may be coated on the portions opposing the respective electrode elements, i.e. not only the side surfaces of the partitions 18 but also the groove bottom surface between the respective partitions 18 as shown in FIG. 6.

Therefore, the area in which the phosphors are coated may be increased, and hence the brightness may be increased.

That is, according to the above-mentioned plasma-discharge display device thus arranged, since the interval between the respective electrodes can be set accurately, the design of the discharge space or the like can be optimized, the coated area of the phosphors can be increased and so on. Hence, it is possible to construct the display device which can be manufactured with ease and which has excellent homogeneity and stability and high accuracy.

As described above, in the color projector according to the present invention, since the plasma-discharge display devices 21R, 21G and 21B capable of producing respective single color images of lights of red, green and blue are each comprised of the plasma-discharge display device having a high brightness, excellent homogeneity and stability and a high accuracy. Therefore, a bright color projection image of excellent image quality may be reproduced on the screen 24.

As described above, since the color projector according to the present invention does not employ such an arrangement that the light from a light source is modulated by a light bulb but employs such an arrangement that images R, G and B of lights of red, green and blue colors are directly obtained and the color projection image is obtained by synthesizing these images, a sufficiently bright color projection image can be obtained. Also, it is possible to avoid the device from becoming complex, large in size, the manufacturing and assembly process from becoming complicated and so on due to the fact that a large power light source is used, a large power cooling fan is provided and so on.

Moreover, since the plasma-discharge display device thereof is arranged such that the first and second electrode groups for the discharging are disposed on the common substrate as described above, the interval between the respective electrodes may be set accurately, the design of the discharge space or the like may be optimized, the coated area of the phosphor layers may be increased, and so on. Hence, there can be arranged the display device which can be manufactured with ease and which has a high brightness, excellent homogeneity and stability and high accuracy. Thus, by using these plasma-discharge display devices, it is possible to construct the color projector having excellent characteristics which may be manufactured with ease.

Then, since images of lights of respective colors are produced from the plasma-discharge display devices as described above, there may be achieved the effects in which a handling of a high voltage may be avoided unlike the prior art in which images of lights of respective colors are produced from the cathode-ray tube.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A color projector, comprising:
   a plurality of plasma-discharge display devices, each plasma-discharge display device of said plasma-discharge display devices producing a single color image;
   a synthesizing apparatus for combining all said single color images produced by said plurality of plasma-discharge display devices to form a synthesized image; and
   a projection optical system for projecting said synthesized image,
   wherein said each plasma-discharge display device includes:
   a first substrate;
   a plurality of first electrodes on said first substrate; and
   a plurality of second electrodes on said first substrate, each second electrode of said plurality of second electrodes includes:
   a conductive discharge-electrode portion on said first substrate;
   an electrode insulator on said discharge-electrode portion, said first substrate, and each first electrode of said plurality of first electrodes; and
   a band electrode portion on said electrode insulator.

2. A color projector as claimed in claim 1, further comprising:
   a connection piece in contact with said band electrode portion and said discharge-electrode portion to form an electrical connection between said band electrode portion and said discharge-electrode portion.

3. A color projector as claimed in claim 1, wherein said discharge-electrode portion has an L-letter configuration.

4. A color projector as claimed in claim 1, wherein said discharge-electrode portion has a U-letter configuration.

5. A color projector as claimed in claim 1, wherein said discharge-electrode portion has zigzag configuration.

6. A color projector as claimed in claim 1, wherein said single color comprises one of red, green and blue.

7. A color projector as claimed in claim 1, wherein said synthesizing apparatus comprises a dichroic mirror.

8. A color projector as claimed in claim 1, wherein said synthesizing apparatus comprises a dichroic prism.

9. A color projector as claimed in claim 1, wherein said each second electrode is substantially perpendicular to said each first electrode of said plurality of first electrodes.

10. A color projector as claimed in claim 1, wherein said electrode insulator is an oxide.

11. A color projector as claimed in claim 1, wherein said discharge-electrode portion and said plurality of first electrodes-are formed from the same conductive material.

12. A color projector as claimed in claim 1, further comprising:
    a dielectric layer formed over said first substrate, said plurality of first electrodes, and said plurality of second electrodes.

13. A color projector as claimed in claim 12, further comprising:
    a magnesium oxide formed over said dielectric layer.

14. A color projector as claimed in claim 1, further comprising:
    a second substrate formed over said first substrate, said plurality of first electrodes, and said plurality of second electrodes.

15. A color projector as claimed in claim 14, wherein said second substrate includes:
    a plurality of partitions, each partition of said plurality of partitions being located in opposing relation to each said band electrode portion.

16. A color projector as claimed in claim 14, wherein a phosphor layer is formed between said each partition and a neighboring partition.

17. A color projector as claimed in claim 14, wherein said second substrate includes:

a phosphor layer formed in opposing relation to said discharge-electrode portion.

18. A color projector as claimed in claim 14, wherein one of said first substrate and said second substrate is a transparent substrate.

19. A color projector as claimed in claim 14, wherein one of said first substrate and said second substrate is a glass substrate.

20. A color projector as claimed in claim 1, further comprising:

a plurality of additional first electrodes on said first substrate.

21. A color projector as claimed in claim 20, wherein each additional first electrodes of said plurality of additional first electrodes is in parallel with said each first electrode and is located between said each first electrode and said discharge-electrode portion.

* * * * *